Jan. 10, 1956 G. E. HAYDEN-PIGG 2,730,575
SYNC PULSE-EMPHASIZING AMPLIFIER
Filed Sept. 11, 1951
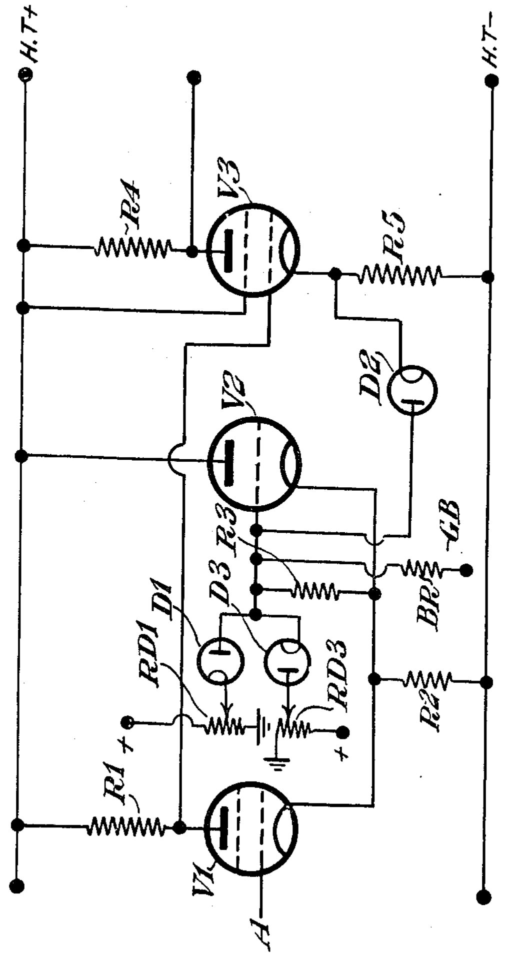
Inventor
Godfrey Edmund Hayden-Pigg,
By his attorneys;
Baldwin & Wight United States Patent Office 2,730,575
Patented Jan. 10, 1956

2,730,575

SYNC PULSE-EMPHASIZING AMPLIFIER

Godfrey Edmund Hayden-Pigg, Laindon, England, assignor to Marconi's Wireless Telegraph Company Limited, London, England, a company of Great Britain Application September 11, 1951, Serial No. 246,007

Claims priority, application Great Britain September 29, 1950

5 Claims. (Cl. 179—171)

This invention relates to distorting amplifiers for use in television systems and more particularly to such amplifiers for use in television systems of the kind wherein video and synchronizing signals form a composite wave in which the video signals occupy one range of amplitudes and the synchronizing signals another. In general, in present day television practice the synchronizing signals are "blacker than black" the video signals going from black to white. For the sake of simplicity in description it will be assumed hereinafter that the invention is applied to systems with "blacker than black" synchronizing signals, though as will be hereinafter pointed out, it is equally applicable to systems in which the synchronizing signals are "whiter than white."

In television systems of the kind referred to it is frequently desired in the transmitter to adjust the amplitude of the synchronizing signals without affecting the video signals; in other words, it is frequently desired to "stretch" the synchronizing signals and make them of large stable amplitude. It is also frequently desired to produce an amplifier in which the video signals are distorted in order to overcome non-linear amplification elsewhere in the transmitter, the distortion usually being required towards the limits of the range of amplitudes of the video signals. The present invention provides a simple and reliable circuit arrangement whereby these requirements can be satisfied.

According to this invention a distorting amplifier arrangement for use in a television system of the kind referred to comprises a first valve which is connected in a circuit providing inherent negative feedback therefor and has a grid to which the composite input signal is applied, a second valve interconnected with said first valve so as to reduce the negative feedback or make the total feedback positive, means including a unilaterally conductive device for applying input signals to a grid of said second valve to cause it to respond to synchronizing signals exceeding a predetermined amplitude in the synchronizing signal direction and thereby applying positive feedback to said first valve when such synchronizing signals are present and means including at least one further unilaterally conductive device for applying distortion bias to said second valve when a predetermined video signal amplitude is reached.

Preferably the means for applying distorting bias to the second valve comprise two unilaterally conductive devices connected each between a bias source of different polarity and a grid of said second valve, the senses of connection of said devices being opposite so that distorting bias is applied when the input video signal amplitude is less than a predetermined amplitude and also when it is more than another predetermined amplitude.

Preferably the first and second valves have a common cathode leg resistance and the latter has its control grid resistively connected to its cathode, output from the first valve being applied to the grid of a third valve which provides output from its anode circuit and which has its cathode connected back through a rectifier to the control grid of the second valve.

The invention is illustrated in and further explained in connection with the accompanying drawing which is a diagram of a preferred embodiment.

Referring to the drawing an input composite wave consisting of video signals, synchronizing signals and a D. C. component is applied to the control grid of a first valve V1 with what may be termed "negative polarity"—that is to say in such sense that the synchronizing pulses are positive going and the video signals negative going. This valve has its cathode connected to negative H. T. through a cathode leg resistance R2 and its anode connected to positive H. T. through an anode resistance R1. A second valve V2 has its anode connected to H. T. positive and its cathode connected to H. T. negative through the above mentioned cathode leg resistance R2 which is therefore common to both valves V1 and V2. The anode of the first valve V1 is coupled to the control grid of a third valve V3 whose anode is connected to positive H. T. through a suitable anode resistance R4 and whose cathode is connected to negative H. T. through a suitable cathode leg resistance R5. Output is taken from between the anode of the valve V3 and H. T. negative. The cathode of the valve V3 is connected through a diode D2 to the control grid of valve V2, the anode of said diode being towards said grid. The said control grid of the valve V2 is also connected to the cathode of the same valve through a low resistance R3 and has suitable negative bias applied thereto through a bias resistance BR. The said grid of the valve V2 is also connected to two further diodes D1, D3, connection being made to the anode of one (D1) and to the cathode of the other (D3). The remaining electrodes of these two diodes are tapped each upon one of two resistances RD1 and RD3 each of which is connected between its own source of bias potential and earth. The source of bias potential associated with the diode D1 whose anode is towards the grid of the valve V2 is positive and the other source is also positive but of less magnitude than the source associated with D1. If desired, an adjustable threshold potential source may be associated with the diode D2.

With this arrangement it will be seen that if none of the three diodes is conducting the grid of the valve V2 will follow the voltage wave form across the common cathode leg resistance R2 and the said valve will appear as a passive resistance element in shunt with the said common resistance. When, however, a positive going synchronizing pulse on the control grid of the valve V1 drives the potential of the cathode of the valve V3 below that of the anode of the diode D2, the said diode will conduct and cause the grid of the valve V2 to follow the pulse. This reduces the current through the valve V2 and therefore through the resistance R2 thus producing positive feedback on the valve V1 and overcoming inherent negative feedback due to the presence of the said resistance R2. The whole arrangement is such that the system operates in triggered fashion, the synchronizing pulse increasing rapidly in amplitude until the valve V2 cuts off. In this way, so long as the input synchronizing pulses reach a predetermined minimum amplitude, the output synchronizing pulses will be of desired large amplitude independent of the input amplitude.

The diodes D1 and D3 and their associated bias sources serve to introduce desired pre-distortion when the video signals exceed predetermined limits of amplitude, i. e., when they approach "black" and "white," the bias sources being so adjusted that when one or other of these predetermined limits is reached one or other of the said diodes becomes conductive. As will be obvious, when either of these diodes conducts the potential of the grid of the valve V2 will no longer follow the potential of the cathode of said valve and accordingly there will be produced a reduced voltage excursion at the cathode of the valve V1 with a resultant positive non-linear increase of gain in the system. During video signals the diode D2 is, of course, nonconductive. The diodes D1, D3 and their associated bias sources may be separately adjusted to introduce the desired distorting effects at the desired upper and lower values of video amplitude.

Obviously the invention may also be used in systems with positive going signals—i. e., signals with negative going synchronizing pulses—applied to the grid of the first valve. For this case the connections to the diode D2 will be reversed (as compared to Figure 1) and the biasses on the diodes D1, D3 must be appropriately adjusted. When this method of connection is used the triggered increase in the synchronising pulse amplitude will be limited by anode current cut-off in the valve V1.

What I claim as new and desire to secure by Letters Patent of the United States is as follows:

1. A distorting amplifier arrangement for use in a television system of the kind wherein video and synchronizng signals form a composite wave with the video signals occupying a range of amplitudes in one direction from a datum amplitude and the synchronizing signals occupying a range of amplitudes in the opposite direction from said datum amplitude, said amplifier comprising a first valve including at least a cathode, a control grid and an anode, said control grid being connected for application thereto of video signals including positive going synchronizing impulses, means providing inherent negative feedback for said first valve, said means including a first resistor in the cathode lead thereof and a second resistor between the anode thereof and the positive terminal of a power supply, means for applying said composite wave between the control grid and cathode of said first valve, a second valve having at least a cathode, a control grid and an anode, a resistance connected in shunt between the control grid and cathode of said second valve, connections between the cathodes of said first and second valves and between the anode of said second valve and said positive terminal, said first resistor being connected at one end to said cathode and at the other end to the negative side of said power supply, means responsive to synchronizing signals exceeding a predetermined amplitude in said opposite direction to maintain conduction in said second valve to oppose the inherent negative feedback of said first valve, said means including a resistance between a potential source more negative than the potential of said cathodes and the control grid of said second valve, a rectifier in the control grid circuit of said second valve and connected to receive said composite wave, said rectifier being connected in the sense to conduct the synchronizing signals in said composite wave, a third valve including a cathode and at least one additional electrode, the output from the first valve being applied to the additional electrode of said third valve, the cathode of said third valve being connected back through said rectifier to the control grid of said second valve and a resistance between the cathode of said third valve and the negative side of said power supply.

2. A distorting amplifier arrangement as set forth in claim 1 including two further rectifiers connected each between a bias source of different polarity and the control grid of said second valve, the senses of connection of said further rectifiers being opposite whereby distorting bias is applied when the input video signal amplitude is less than a predetermined amplitude and also when it is more than another predetermined amplitude.

3. A distorting amplifier arrangement as set forth in claim 1 wherein said rectifier is a tube containing a cathode and an anode, the said cathode of said rectifier being connected intermediate the cathode of said third valve and the end of said last mentioned resistance and the anode of said rectifier being connected to the control grid of said second valve.

4. A distorting amplifier arrangement as set forth in claim 1 in which there are two further rectifiers each containing a cathode and an anode, an adjustable potential connected with the cathode of one rectifier, a connection between the anode of said last mentioned rectifier and the control grid of said second valve, an adjustable potential connected with the anode of the other of said two further rectifiers and a connection between the cathode of said last mentioned rectifier and the control grid of said second valve whereby distorting bias is applied when the input video signal amplitude is less than a predetermined amplitude and also when it is more than another predetermined amplitude.

5. A distorting amplifier arrangement as set forth in claim 1 in which the additional electrode of said third valve is connected to the anode of said first valve and wherein the rectifier that connects the cathode of said third valve with the control grid of said second valve is a diode constituting a unidirectional path for the passage of current from said third valve to said second valve.

References Cited in the file of this patent

UNITED STATES PATENTS

| | | |
|---|---|---|
| 2,141,343 | Campbell | Dec. 27, 1938 |
| 2,261,335 | Braden | Nov. 4, 1941 |
| 2,558,390 | Roschke et al. | June 26, 1951 |

FOREIGN PATENTS

| | | |
|---|---|---|
| 106,171 | Australia | Dec. 14, 1938 |